3,227,515
VANADIUM RECOVERY PROCESS
Robert E. Reusser, Bartlesville, Okla., assignor to Phillips Petroleum Company, a corporation of Delaware
No Drawing. Filed Aug. 20, 1962, Ser. No. 218,098
8 Claims. (Cl. 23—14.5)

This invention relates to the recovery of vanadium values from roast quench solutions.

An important and widely employed hydrometallurgical process for recovering uranium from uranium-bearing materials is the carbonate leaching process. This leaching process has been applied to both primary and secondary uranium mineral deposits, such as pitchblende, coffinite, carnotite, uraninite, tyuyamunite, etc., but it is particularly useful in leaching ore of high carbonate content.

The carbonate leaching process for extracting uranium values from the uranium-bearing materials comprises contacting crushed uranium-bearing ore with hot aqueous alkaline sodium carbonate-sodium bicarbonate solution and, where uranium is present in the quadrivalent state, an oxidizing agent, such as potassium permanganate or air, to form a slurry of leached pulp and pregnant leach liquor containing a stable soluble uranyl tricarbonate complex anion. The pregnant leach solution is separated from the leached pulp, for example, by means of a plurality of vacuum drum filters operated in series. After the pregnant leach solution is clarified, for example, by filtering it through a precoated drum filter, the soluble uranium values are precipitated from the pregnant liquor by the addition of an excess of caustic, such as sodium hydroxide. This addition of sodium hydroxide neutralizes the bicarbonate present and then causes the soluble uranium values to precipitate as sodium diuranate (the precipitate commonly called "yellow cake"). The slurry of precipitated yellow cake is then thickened and separated, for example, by filtering the thickened slurry in a rotary filter. The yellow cake is then dried and packaged. The hydroxide-carbonate solution recovered as overflow during the thickening of the caustic-pregnant solution is commonly referred to as "barren liquor" and it is recarbonated by passing carbon dioxide through it, using, for example, a supply of waste carbon dioxide such as flue gas. Recarbonated barren liquor is then commonly employed as a carbonate-bicarbonate wash liquid in the filtration of the slurry of leached pulp and pregnant leach solution. The recarbonated barren liquor is then recycled to the leaching operation for reuse.

Other metals and non-metals are commonly associated with uranium-bearing material. The principal metal commonly associated with uranium-bearing materials is vanadium, although other metals such as zirconium, iron, titanium, barium, aluminum, antimony, and cobalt, and non-metallic elements such as silicon and phosphorus are commonly associated with uranium-bearing materials. These other metals and non-metals, especially vanadium, are commonly extracted with the uranium values in the carbonate leaching step. During the subsequent precipitation of the pregnant leach solution with caustic, vanadium values present in the pregnant liquor will be precipitated together with uranium values. The other metals and non-metals, present as impurities in the pregnant liquor, will also tend to be precipitated with the yellow cake or become occluded therein.

The precipitated sodium diuranate containing vanadium values can be heated, or roasted, at elevated temperatures in the range between about 650° and 670° C. in the presence of 0.5 to 15 weight percent of a salt supplying sodium ion so as to solubilize the vanadium values present in the sodium diuranate. The resulting roasted sodium diuranate is contacted with water to dissolve the solubilized vanadium values, and the resulting insoluble, purified sodium diuranate is recovered from the leaching solution by filtration or the like. The filtrate, containing the vanadium values and other heretofore described impurities in solution, is hereinafter referred to as "roast quench liquor."

A conventional method for recovery of vanadium values from roast quench liquors and from other vanadium-containing streams is to acidify the solution to a pH generally less than 2 and thereafter heat the solution to boiling. Such a method of treatment effects the precipitation of sodium hexametavanadate. This material is commonly referred to as "red cake." While red cakes from primary vanadium ores are frequently of sufficient purity to permit further processing, red cakes from roast quench liquors generally contain a very high percentage of the impurities contained in the roast quench liquor. For example, silica is often present in considerable amounts and this impurity impedes conventional recovery methods. The fusing of this red cake for the production of black cake ($V_2O_5$) does not provide a material reducible to vanadium metal of high purity. Therefore, it is highly desirable that a process be provided for the effective recovery of high purity vanadium values from roast quench liquors.

The roast quench liquors obtained from the water leaching of roasted sodium diuranate will generally contain from 5 to 75 grams per liter $V_2O_5$. The presence of the heretofore described impurities in the roast quench liquors prevents the utilization of conventional concentration methods to increase the concentration of $V_2O_5$. For example, if an attempt to concentrate the roast quench liquor by total or partial evaporation was made, crystallization of at least a portion of the impurities as salts would occur with the resulting loss of vanadium values and/or the recovery of vanadium values of low purity.

I have discovered that vanadium values can be recovered from roast quench liquors by a process which comprises lowering the pH of said roast quench liquors to at least 9.0 and thereafter treating said roast quench liquors with an ammonium salt of a strong acid.

Accordingly, an object of my invention is to provide a process for the recovery of vanadium values from basic solutions of said vanadium values.

Another object of my invention is to provide a process for the recovery of vanadium values from basic solutions of said vanadium values in high yields and of high purity.

Another object of my invention is to provide a process for the recovery of vanadium values from roast quench liquors.

Other objects, advantages, and features of my invention will be readily apparent to those skilled in the art from the following description and the appended claims.

The process of this invention is applicable to the recovery of vanadium values from basic solutions of said vanadium values, said basic solutions having a pH higher than 9.0 and wherein the concentration of vanadium values is at least 5.0 grams per liter. The process of this invention is particularly applicable to the recovery of vanadium values from roast quench liquors wherein the concentration of $V_2O_5$ in the roast quench liquor ranges from 5.0 grams per liter to saturation and normally ranges from 5.0 to 300 grams per liter with the higher concentrations of $V_2O_5$ obtained when sodium hexametavanadate is employed to lower the pH of the roast quench liquor in the hereinafter described manner.

The pH of the basic vanadium solution can be lowered by the addition thereto of a mineral acid such as sulfuric acid, nitric acid, hydrochloric acid, phosphoric acid, or by the addition of sodium hexametavanadate, hereinafter referred to as red cake. The pH of the basic vanadium solution is lowered to at least 9.0 and preferably to at least 8.2 prior to the addition of the ammonium salt of a strong acid.

To the basic vanadium solution having a pH of at least as low as 9.0 an ammonium salt such as ammonium nitrate, ammonium sulfate and ammonium chloride is added. The concentration of ammonium salt will vary with the ammonium salt employed. When employing ammonium sulfate the weight ratio of ammonium sulfate to $V_2O_5$ will range from 1.5:1 to 10:1. Preferably, with higher concentrations of $V_2O_5$ the weight ratio of ammonium sulfate to $V_2O_5$ will range from 1.5:1 to 3.0:1.

Upon the addition of the ammonium salt to the vanadium solution ammonium vanadate is precipitated. The purity of the ammonium vanadate is high. The precipitated material can be separated from the filtrate by conventional means and converted to $V_2O_5$ by a conventional fusing process such as heating the precipitate to a temperature in the range of 300–800° C. The resulting $V_2O_5$ is a higher purity compound generally containing above 98 weight percent $V_2O_5$.

If silica is present in the basic vanadium feed solution, the silica can be removed from solution prior to the lowering of the pH by adding a soluble inorganic aluminum compound to the basic vanadium solution. The separation of silica from pregnant carbonate leach solutions by the addition thereto of an inorganic aluminum compound is described in copending application Serial No. 22,690, filed April 18, 1960, by James L. Hart, now Patent No. 3,105,734.

I have discovered that uranium values present in the basic vanadium solution can be separated from said vanadium solution by lowering the pH of the vanadium solution to at least 6.8 and not lower than 6.0. In the range of 6.0 to 6.8 the uranium values will precipitate from the basic vanadium solution. After removal by filtration of the uranium values an ammonium salt is added to the filtrate in the heretofore described manner.

The barren solution obtained after the separation of the precipitated ammonium vanadate can be heated to drive off the ammonia. This ammonia can be utilized in the preparation of additional ammonium salt precipitating agent.

The following specific examples are presented to illustrate the advantages of the process of this invention. It is not intended, however, that the invention be limited to the specific embodiments shown therein.

EXAMPLE I

In order to demonstrate the necessity of lowering the pH of the basic vanadium solution a series of runs were conducted in which a roast quench liquor of the following composition:

| | Grams/liter |
|---|---|
| $U_3O_8$ | 1.27 |
| $V_2O_5$ | 64.6 |
| Mo | 1.20 |
| $SiO_2$ | 6.1 |
| $Na_2SO_4$ | 37.0 | and having a pH of 12.1 was treated with various amounts of ammonium sulfate as shown in Table I. In each run 100 ml. of the roast quench liquor was treated with the listed amount of ammonium sulfate, after which the mixture was permitted to stand for 18 hours. The formed precipitate was then filtered off and the filtrate analyzed for $V_2O_5$. The results of the runs are shown in Table I.

*Table I*

| Run No. | Ml. of Roast Quench Liquor | Grams $(NH_4)_2SO_4$ Added | Wt. Ratio $(NH_4)_2SO_4/V_2O_5$ | pH Initial | pH Final | g./l. $V_2O_5$ in Filtrate | Wt. percent $V_2O_5$ Precipitated |
|---|---|---|---|---|---|---|---|
| 1 | 100 | 20 | 3.1 | 12.1 | 9.6 | 24.29 | 62.4 |
| 2 | 100 | 30 | 4.6 | 12.1 | 9.5 | 19.50 | 69.8 |
| 3 | 100 | 40 | 6.2 | 12.1 | 9.5 | 9.76 | 84.9 |

The results obtained illustrate that even with a weight ratio of 6.2 pounds of ammonium sulfate per pound of $V_2O_5$ only 84.9 weight percent of $V_2O_5$ was recovered.

EXAMPLE II

In order to compare the results obtained by the addition of an ammonium salt to a vanadium solution of lowered pH, the runs illustrated in Table II were made. The roast quench liquor and the test conditions were the same as employed in Example I. In these two runs, the pH was lowered from 12.1 to 9.5 and 8.0 respectively by the addition of sulfuric acid.

*Table II*

| Run No. | Ml. of Roast Quench Liquor | Grams $(NH_4)_2SO_4$ Added | Wt. Ratio $(NH_4)_2SO_4/V_2O_5$ | pH Initial | pH Final | g./l. $V_2O_5$ in Filtrate | Wt. Percent $V_2O_5$ Precipitated |
|---|---|---|---|---|---|---|---|
| 4 | 100 | 40 | 6.2 | 9.5 | 9.0 | 1.48 | 97.70 |
| 5 | 100 | 40 | 6.2 | 8.0 | 7.4 | 0.56 | 99.13 |

The above results clearly indicate the value of lowering the pH to at least 9.0.

EXAMPLE III

To 700 ml. of the roast quench liquor of Example I, 80 grams of sodium carbonate was added, and to 350 ml. of the resulting solution was then added 50 grams of red cake having the following analysis:

| | Weight percent |
|---|---|
| $V_2O_5$ | 71.45 |
| Total sulfur | 2.42 |
| Mo | 0.47 |
| $U_3O_8$ | 0.038 |
| Fe | 1.3 |
| $PO_4$ | 0.48 |
| Na | 6.6 |
| $SiO_2$ | 2.8 |

The resulting mixture was stirred for 15 minutes and filtered. The filtrate contained 168.72 grams per liter $V_2O_5$ and had a pH of 9.5. The solution was then treated with ammonium sulfate by the procedure employed in Examples I and II. The results are illustrated in Table III.

Table III

| Run No. | Ml. of Roast Quench Liquor | Grams $(NH_4)_2SO_4$ Added | Weight Ratio $(NH_4)_2SO_4/V_2O_5$ | pH Initial | pH Final | g./l. $V_2O_5$ in Filtrate | Wt. Percent $V_2O_5$ Precipitated from Roast Quench Liquor |
|---|---|---|---|---|---|---|---|
| 6 | 100 | 20 | 1.2 | 9.5 | 9.3 | 85.13 | |
| 7 | 100 | 30 | 1.8 | 9.5 | 9.4 | 41.37 | 36 |
| 8 | 100 | 40 | 2.4 | 9.5 | 9.4 | 11.42 | 82.3 |

EXAMPLE IV 350 ml. of the 168.72 grams per liter $V_2O_5$ solution of Example III was mixed with 200 grams of the red cake of Example III. The mixture was heated to 70° C. for 30 minutes and then filtered. The filtrate was treated as before with ammonium sulfate. This filtrate had a pH of 8.05 and contained 268.61 grams per liter $V_2O_5$. The results are shown in Table IV.

Table IV

| Run No. | Ml. of Roast Quench Liquor | Grams $(NH_4)_2SO_4$ Added | Weight Ratio $(NH_4)_2SO_4/V_2O_5$ | pH Initial | pH Final | g./l. $V_2O_5$ in Filtrate | Wt. Percent $V_2O_5$ in Roast Quench Liquor Precipitated |
|---|---|---|---|---|---|---|---|
| 9 | 100 | 20 | 0.07 | 8.05 | 8.1 | 184.83 | |
| 10 | 100 | 30 | 1.1 | 8.05 | 8.15 | 58.83 | 9 |
| 11 | 100 | 40 | 1.5 | 8.05 | 8.1 | 2.80 | 95.7 |

From the above it can readily be seen that with only a weight ratio of ammonium sulfate to $V_2O_5$ of 1.5 substantially all of the $V_2O_5$ was recovered. A comparison of the results obtained in Examples III and IV clearly establishes the value of lowering the pH to at least 8.2 prior to the addition of ammonium sulfate. A substantially higher percentage of the $V_2O_5$ was precipitated with a substantially lower weight ratio of ammonium sulfate to $V_2O_5$.

EXAMPLE V

One liter of the roast quench liquor of Example I was treated by the addition thereto of a solution of aluminum sulfate (24 grams $Al_2(SO_4)_3 \cdot 18H_2O$ in 25 ml. water) at room temperature. The resulting mixture was permitted to stand overnight after which the precipitate which had formed was filtered and discarded. The filtrate was then analyzed and found to contain 0.23 gram per liter $SiO_2$, 62.0 grams per liter $V_2O_5$, and 0.68 gram per liter $U_3O_8$. The filtrate had a pH of 11.7.

350 ml. of the above filtrate was treated with 19 grams of 95 percent by weight aqueous sulfuric acid. This lowered the pH to 6.2. A yellow uranium precipitate formed and was separated from the filtrate. The filtrate analyzed 0.04 grams per liter $U_3O_8$.

150 ml. of a filtrate of low uranium content was then treated with 60 grams of ammonium sulfate. The resulting mixture was permited to stand overnight. A formed white precipitate was separated from the filtrate and the filtrate analyzed. The filtrate contained 0.2 gram per liter $V_2O_5$.

Analysis of the white ammonium vanadate precipitate provided a metallic composition as follows:

|  | Weight percent |
|---|---|
| $U_3O_8$ | 0.034 |
| $V_2O_5$ | 75.7 |
| $SiO_2$ | 0.10 |

By substantially removing the silica and $U_3O_8$ from the roast quench liquor prior to precipitation of the ammonium vanadate, a substantially pure $V_2O_5$ product was obtained.

As will be evident to those skilled in the art, various modifications of this invention can be made, or followed, in the light of the foregoing disclosure without departing from the spirit or scope thereof.

I claim:

1. A process for the recovery of vanadium values from a solution having a pH above 9.0 and containing said vanadium values which comprises lowering the pH of said solution to at least 9.0, contacting said solution with an ammonium salt of a strong acid, and separating precipitated vanadium values from said solution.

2. The process of claim 1 wherein the pH of said solution is lowered to at least 8.2.

3. The process of claim 1 wherein the ammonium salt employed is ammonium sulfate and the weight ratio of ammonium sulfate to $V_2O_5$ is in the range of 1.5:1 to 10:1.

4. The process of claim 1 wherein said precipitated vanadium values are fused by heating said precipitated vanadium values to a temperature in the range of 300–800° C.

5. A process for the recovery of vanadium values from a roast quench liquor obtained upon the roasting of a sodium diuranate material containing vanadium values and the leaching of the roasted material with water having a pH above 9.0 and containing said vanadium values and also containing uranium values which comprises lowering the pH of said roast quench liquor to within the range of 6.0 to 6.8, separating precipitated uranium values from said solution, contacting said solution with an ammonium salt of a strong acid, and separating precipitated vanadium values from said solution.

6. The process of claim 5 wherein the ammonium salt employed is ammonium sulfate and the weight ratio of ammonium sulfate to $V_2O_5$ is in the range of 1.5:1 to 10:1.

7. A process which comprises the carbonate leaching of an ore containing uranium and vanadium values, adding caustic to the separated leach solution, separating a precipitated yellow cake containing uranium and vanadium values from said solution, roasting said precipitated yellow cake in the presence of 0.5 to 15 weight percent of a salt supplying sodium ion, contacting the roasted yellow cake with a water quench, separating a roast quench liquor from said yellow cake, lowering the pH of said roast quench liquor to at least 9.0, contacting said roast quench liquor with an ammonium salt of a strong acid, and separating precipitated vanadium values from said roast quench liquor.

8. The process of claim 7 wherein the pH of said roast quench liquor is lowered to within the range of 6.0 to 6.8 and precipitated uranium values are separated from said roast quench liquor.

References Cited by the Examiner

Butler: Engineering and Mining Journal, vol. 152, No. 3, March 1951, pp. 56–62.

McClaine: Peaceful Uses of Atomic Energy, vol 8, 1956, pp. 26–37.

CARL D. QUARFORTH, *Primary Examiner.*